United States Patent Office 3,174,930
Patented Mar. 23, 1965

3,174,930
METHOD OF PREPARING AN ALUMINUM OXIDE GEL AND LUBRICATING COMPOSITIONS THEREOF
Vivian R. Damerell, Cleveland, Ohio, assignor to The Warren Refining and Chemical Company, Cleveland, Ohio, a corporation of Ohio
No Drawing. Filed June 5, 1961, Ser. No. 114,610
5 Claims. (Cl. 252—25)

This invention relates to methods of preparing aluminum-containing compositions and more specifically to methods of preparing aluminum oxide and hydrated aluminum oxide gels. Still more specifically, it relates to methods of preparing waterproofed alumina hydrate gels and particularly to the use of these gels in the preparation of lubricants.

The aluminum oxide and hydrated aluminum oxide gels of this invention are prepared by reacting a carbonate with aluminum sulfate in an aqueous medium to form an intermediate of basic aluminum sulfate-carbonate hydrogel. This intermediate can be (1) hydrolyzed directly to a hydrated aluminum oxide hydrogel, or (2) it can be dried to an aerogel, and then heated to form aluminum oxide.

ALUMINUM OXIDE

In preparing the aluminum oxide, the hydrogel intermediate is first converted to its aerogel by heating to temperatures up to about 165° C. and then converted to aluminum oxide by heating the areogel to temperatures above 165° C. The aerogel of basic aluminum sulfate-carbonate is a material like the hydrogel except that the liquid, e.g. $H_2O$, normally used in preparing the gel has been replaced by a gas or vapor without excessive shrinkage of the gel structure. Generally, when a gel is dried the network of solid particles responsible for the gel structure shrinks and collapses because of powerful surface tension forces which act on it as the surface of the evaporating liquid goes within the pores of the gel network. This behaves in the same manner as a compression, and may reach thousands of pounds per square inch. As a result of this collapsing force, most gels shrink to a dense form known as xerogels. Any attempt to reform the normal gel by the addition of liquids is difficult because of the shrunken state of the xerogel.

This collapsing of the hydrogel structure, due to drying, may be prevented or made less pronounced by using certain processing conditions. Heretofore, the condition necessary to obtain an aerogel was that the temperature of the hydrogel be raised above the critical temperature of the liquid phase before the gel was dried. The pressure developed by the system was sufficiently high to insure that the liquid phase would remain liquid until the critical temperature was reached. At the critical temperature, the surface tension of the liquid, and, thus, the collapsing force drop to zero. The gas resulting from the original liquid in the gel was removed at this elevated temperature, and the dried aerogel was brought back to normal temperatures and pressures.

In accordance with this invention, however, it is possible to prepare an aluminum oxide from a basic aluminum sulfate-carbonate aerogel, which in turn is prepared easily and economically from its hydrogel without resorting to the use of critical temperatures and pressures. A possible explanation for this achievement may be that the surface tension compression forces accompanying drying are less potent than usual here because (1) water in the gel has been, in part, replaced by carbon dioxide or is displaced because of the formation of carbon dioxide caused by partial hydrolysis of basic aluminum carbonate during drying; (2) these bubbles of carbon dioxide may further lessen the collapsing force as the water surface recedes within the gel network by taking much of the pull and becoming deformed in the process; and (3) there may be present here a stronger than usual gel network because of electrostatic attraction between the oppositely charged parts of the small particles formed in this process.

HYDRATED ALUMINUM OXIDE GEL

In preparing the hydrated aluminum oxide hydrogel, the basic aluminum sulfate-carbonate intermediate is hydrolyzed by boiling it in an aqueous medium. The intermediate is prepared by reacting one equivalent of aluminum sulfate with approximately one equivalent of alkali metal or ammonium carbonate. The precipitate obtained from this reaction mixture is referred to herein as being a basic aluminum sulfate-carbonate hydrogel. It is referred to as being "basic" because the number of equivalents of sulfate and carbonate ions are less than the number of equivalents of aluminum ion. More specifically, the aerogels of basic aluminum sulfate-carbonate hydrogels have a bulk density of about 3.5–6 pounds per cubic foot and consist essentially of one to two equivalents of sulfate ion, one to two equivalents of carbonate ion, and at least six, but not more than 50 equivalents of aluminum ion. Depending on reaction conditions, the basic aluminum sulfate-carbonate hydrogel normally contains about one equivalent of sulfate ion, about one equivalent of carbonate ion, and about 20 equivalents of aluminum ion. The dried, pulverized product has a bulk density of about 4 lbs./cu. ft., and has a formula of

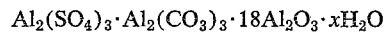

$$Al_2(SO_4)_3 \cdot Al_2(CO_3)_3 \cdot 18Al_2O_3 \cdot xH_2O$$

where the water content varies with the drying conditions. In the commercial product, there will also be very small amounts of sodium, iron, and traces of other impurities from the reactants.

In instances where the basic aluminum sulfate-carbonate hydrogel is hydrolyzed to a hydrogel of hydrated aluminum oxide, an organic hydrophobic surface active agent can be added to a suspension of the hydrogel after it has been hydrolyzed. Alternatively, a surface active agent can be added to a suspension of the hydrogel, and then hydrolyzed to a hydrate of aluminum oxide. The subsequent hydrolysis of the gel suspension at temperatures of about 100° C. has no harmful effects on most surface active agents.

It is accordingly an object of this invention to provide a method of preparing a hydrogel of aluminum oxide hydrate.

It is a further object of this invention to provide a method of preparing aluminum oxide of extremely small particle size.

It is another object of this invention to provide a method of preparing a waterproofed gel of hydrated aluminum oxide.

It is still another object of this invention to provide a method of preparing an aerogel of aluminum oxide.

It is a still further object of this invention to provide a water-resistant lubricating composition.

It is still another object of this invention to provide a method of preparing a water-resistant lubricating grease.

These and other objects of the invention will become apparent from the further and more detailed description.

It has been discovered that very finely divided aluminum oxide can be prepared as an end product in a series of reactions starting by reacting aluminum sulfate with an alkali metal or ammonium carbonate in an aqueous medium at a temperature below the boiling point of the solution. The precipitate obtained from this reaction is a hydrogel which can be dried to an aerogel at atmospheric pressure, by heating it to temperature ranging from 35° C. to 165° C., and then converting it to aluminum oxide by heating to a temperature well above 165°

C. It has been discovered also that a hydrated aluminum oxide gel can be prepared by reacting an equivalent of aluminum sulfate with approximately an equivalent of alkali metal or ammonium carbonate in an aqueous medium at a temperature below the boiling point of the solution to form a basic aluminum sulfate-carbonate. An aqueous suspension of this precipitate is then boiled until the precipitate changes in appearance from white to translucent. As the precipitate hydrolyzes, it also becomes more gelatinous due to the loss of carbonate and sulfate ions and is essentially converted to a hydrated aluminum oxide. It is not, however, the usual amorphous aluminum oxide but a fibrillar form, with evidence of crystal structure. Because of this fibrillar form, this material is an excellent gellant which will form hydrogels with sufficient open structure, such that the material can be filtered and washed with great ease. Since the hydrolysis of basic aluminum sulfate-carbonate takes place uniformly, the product tends to be uniform, with a narrow range of particle size. The dried product has somewhat more water than corresponds to a monohydrate. It may well be $Al_2O_3 \cdot H_2O$ plus adsorbed water.

METHOD OF PREPARING ALUMINUM OXIDE AND HYDRATED ALUMINUM OXIDE GELS

In preparing the hydrated aluminum oxide gels or the aluminum oxide of this invention, an intermediate hydrogel of basic aluminum sulfate-carbonate is prepared first by adding aluminum sulfate to an aqueous solution of alkali metal or ammonium carbonate at a temperature below the boiling point. Conversely, the alkali metal or ammonium carbonate can be added to an aqueous solution of aluminum sulfate at a temperature below the boiling point. The critical aspect is that the neutral or alkaline reaction mixture be kept at a temperature below the boiling point of the reaction solution.

The relative proportion of the aluminum sulfate to the alkali metal or ammonium carbonate is approximately 1:1, based on their equivalent weights. Thus, for every equivalent weight of aluminum sulfate there should be present in the reaction mixture 0.8 to 1.4 equivalents of alkali metal or ammonium carbonate. Of the alkali metals, the carbonates of sodium and potassium are particularly preferred. However, other carbonates and bicarbonates may be used.

Preferably, these basic aluminum sulfate-carbonate hydrogels are prepared by reacting a sulfate with a carbonate in an aqueous solution at a temperature ranging from about 5° C. to 100° C., or 35° C. to 95° C. The pH of the solution at the end of the reaction may vary from 6 to 8, or more. If the pH is on the acid side, the resulting gel wil contain a considerable amount of sulfate and carbonate ions, whereas if the pH is on the alkaline side the sulfate and carbonate ion content will diminish but the particle size of the hydrogel increases. After the aluminum sulfate is added to the aqueous solution of carbonate, the hydrogel precipitate may be allowed to digest, e.g. for 30 to 60 minutes at 60° C. to 70° C., before being converted to aluminum oxide, or hydrate of aluminum oxide.

An aqueous suspension of this basic aluminum sulfate-carbonate hydrogel can be converted to aluminum oxide hydrate by boiling it, e.g. for 5 to 25 minutes depending on the pH, until carbonate and sulfate ions are hydrolyzed off, causing a change in appearance. After hydrolysis, a hydrogel of aluminum oxide hydrate is formed. This hydrogel is then filtered and washed.

In addition to hydrolyzing the basic aluminum-sulfate carbonate hydrogel to aluminum oxide hydrate, by boiling it in water, the gel can be converted to an aerogel by drying it at temperatures of about 35° C. to 165° C., and then converting the basic aluminum sulfate-carbonate aerogel to aluminum oxide with heat. The aerogel must be heated to temperatures well above 165° C., or above 350° C., such as to 600° C. to obtain the aluminum oxide.

The following are illustrations of the methods that can be used to prepare the aluminum oxide and hydrated aluminum oxide gels of this invention.

Example 1

Twenty grams of hydrated aluminum sulfate were dissolved in 300 mls. of water at 50° C. To this solution are added 12 grams of solid sodium carbonate with stirring. A suspension of basic aluminum sulfate-carbonate was obtained. The slightly alkaline solution was then boiled for about ten minutes during which time hydrolysis took place and the suspended precipitate became more gelatinous in appearance. This gelatinous precipitate was subsequently filtered and washed with great ease. The resulting product was a stiff hydrated aluminum oxide hydrogel containing some 96 percent water.

Example 2

Twenty grams of hydrated aluminum sulfate ($Al_2(SO_4)_3 18H_2O$) was dissolved in 500 mls. of water at room temperature. A six percent by weight aqueous solution of anhydrous sodium carbonate was added slowly, with stirring, to the aluminum sulfate solution at a temperature of 35° C. As the sodium carbonate was added, a white precipitate was formed, and carbon dioxide was evolved. The aqueous mixture was heated to 70° C. to facilitate crystal growth, and filtered. The filtered precipitate was washed, then dried at room temperature for 24 to 48 hours. The resulting product was a basic aluminum sulfate-carbonate aerogel having a density after screening of 0.08 gram per ml. This basic aluminum sulfate-carbonate gel was easily converted to an exceedingly fine powder by grinding or passing it through a pulverizer. The resulting product was a typical aerogel which had a bulk density of about four pounds per cubic foot. This powdered aerogel was then heated to 900° C. to remove $SO_3$, $CO_2$, and water, and converted to aluminum oxide of exceeding small particle size.

The particle size of the aluminum oxide, which was converted from the pulverized aerogel in the absence of any sintering effects, was approximately 50 millimicrons. A convenient procedure, for example, for decreasing any sintering effects, would be to entrain the basic aluminum sulfate-carbonate aerogel powder in the stream of air which enters the air intake of a gas burner. The reaction would then take place in the flame, from which the finely-divided aluminum oxide can be recovered.

A hydrophobic gel of Example 1 can be prepared by adding a hydrophobic anionic surface-active agent to a mixture of the reactants to form the hydrophobic derivative in situ. For example, a hydrophobic surface-active agent can be added to an aqueous suspension of the basic aluminum sulfate-carbonate prior to its being hydrolyzed to aluminum oxide hydrate. Alternatively, the surface active agent can be added to the suspension after hydrolysis. The resulting hydrophobic gel can then be dried at room temperature and pressure. Higher drying temperatures, e.g. to 150° C., can be used if it does not destroy the organic constituent of the gel.

The amount of hydrophobic surface-active agent normally needed to render the gel water-resistant usually ranges from about 5 to 35 percent by weight of the gel. The hydrophobic agent is bound to the gel particles by electrostatic attraction. Most of the surface-active agents known in the prior art can be used to prepare the hydrophobic gels of this invention. These may include, for example, higher aliphatic amines, quaternary ammonium compounds, polyamines, and their salts, amides, and other derivatives, such as those containing ether, ester, sulfo, or nitro groups. Suitable aliphatic amines are those having at least 12 carbon atoms, such as dodecyl amine, heptadecyl amine, and other primary, secondary, or tertiary aliphatic amines. The cyclic amines which may be employed include the alkylated imidazolines, such as heptadecyl imidazoline, alkylated pyrimidines and the like. Polyamines include the partially saponified polyalkylene polyamines, such as oleylamido ethylamine oleate, as well as the amidoamines, such as aminoethyl stearamide.

The preferred surfactants, for purposes of this invention, are the anionic hydrophobic surface-active agents which include, for example, the higher fatty acids that can be either saturated or unsaturated, such as stearic acid, oleic acid, and oleinic acid. While the fatty acids should contain a lipophilic hydrocarbon radical having at least 4 carbon atoms, those having at least 12 carbon atoms are preferred. Dicarboxylic acids, such as alkylated succinic acid, also are suitable, including both alkyl and alkenyl succinic acid. Amino acids have been found to be especially useful since they contain two functional groups found to have waterproofing action in the present composition. The amino fatty acids, such as, for example, 12-amino stearic acid, are particularly effective. Sulfonic acids also may be employed. The preferred species of these include the mahogany and the green acids. While the above surface active agents are preferred, a particularly useful class of waterproofing agents comprises the water-soluble soaps of the unsaturated and saturated acids which contain from 4 to 26 carbon atoms per molecule.

Typical examples of preparing hydrophobic alumina hydrate gels and lubricating compositions thereof are as follows:

*Example 3*

Twenty grams of hydrated aluminum sulfate was dissolved in 300 ml. of water at 50° C. To this solution was added 12 grams of solid sodium carbonate with adequate stirring. The slightly alkaline solution was boiled for ten minutes during which time hydrolysis took place and the precipitate became gelatinous in appearance. To this suspended precipitate was added 3 grams of a water-soluble sodium soap of mixed saturated and unsaturated fatty acids (flint chips), with vigorous stirring, for about five minutes. As the sodium soap dissolved and reacted with the precipitate, the latter became whiter and less gelatinous in appearance. The suspension contained an oleophilic, hydrophobic colloidal hydrated aluminum oxide gel.

*Example 4*

The suspension prepared in Example 3 was reheated to about 90° C. and flushed with 50 grams of a mineral oil, with vigorous stirring. The oleophilic colloidal gel associated itself with the mineral oil to form granules of oleogel which rose to the top of the suspension. These granules of grease were caught and washed on a screen, then dried by heating to approximately 150° C. This method of flushing an aqueous suspension of an oleophilic gel with a lubricating oil provides an easy and economical means of preparing greases.

The grease has the following ASTM (D217-A) penetration values.

| Penetration: | Amount of working |
|---|---|
| 220 | Unworked. |
| 220 | 60 strokes. |
| 230 | 10,000 strokes. |
| 235 | 100,000 strokes. |

The mechanical stability of the grease, as measured by the Shell roll test is 85 micropenetration units before and 87 micropenetration units after working. The grease has a dropping point above 500° F., and gave excellent results with respect to rust protection and stability in the presence of boiling water.

*Example 5*

Twenty grams of hydrated aluminum sulfate $$(Al_2(SO_4)_3 18H_2O)$$

was dissolved in 500 mls. of water at room temperature. A six percent by weight aqueous solution of anhydrous sodium carbonate was added slowly, with stirring, to the aluminum sulfate solution at a temperature of about 35° C. As the sodium carbonate was added, a white precipitate was formed and carbon dioxide was evolved. The slightly alkaline solution was boiled for ten minutes, during which time hydrolysis took place and the white precipitate became more gelatinous in appearance. To this suspended precipitate was added 4 grams of stearic acid, with vigorous stirring. As the acid reacted with the precipitate the latter became whiter and less gelatinous in appearance. The suspension contained an oleophilic waterproofed hydrated aluminum oxide gel which could readily be filtered off, washed, dried and powdered.

*Example 6*

Twenty grams of hydrated aluminum sulfate was dissolved in 200 mls. of water at room temperature and 8.75 percent by weight of an aqueous solution of sodium bicarbonate was added slowly, with stirring, to the aluminum sulfate solution at a temperature of about 60° C. The solution was made slightly alkaline and boiled for about ten minutes, during which time hydrolysis took place and the white precipitate became more gelatinous in appearance. To this suspended precipitate was added about 3 grams of sodium oleate, with vigorous stirring, over a period of ten minutes. As the sodium soap dissolved and reacted with the precipitate, the latter becomes whiter and less gelatinous in appearance.

*Example 7*

Twenty grams of hydrated aluminum sulfate was dissolved in 200 mls. of water at 55° C. A solution containing 12 grams of anhydrous sodium carbonate in 100 mls. water was added to the aluminum sulfate solution, with vigorous stirring. This aqueous mixture was then heated to boiling and held there for about ten minutes, during which time hydrolysis took place and the precipitate became more gelatinous in appearance. A solution containing 2 grams sodium lauryl sulfate in 50 mls. water was then added. A hydrated aluminum oxide gel containing absorbed lauryl sulfate ions was obtained.

*Example 8*

Twenty grams of hydrated aluminum sulfate was dissolved in 200 mls. of water. A solution containing 12 grams of anhydrous sodium carbonate in 100 mls. of water was added to the aluminum sulfate and a precipitate was formed. The slightly alkaline solution was boiled for ten minutes during which time hydrolysis took place and the white precipitate became more gelatinous in appearance. To this suspended precipitate was added 0.6 gram of sodium laurate, with vigorous stirring. As the sodium soap was dissolved and reacted with the precipitate, the latter became whiter and more gelatinous in appearance. A suspension of an oleophilic, colloidal hydrated aluminum oxide gel was obtained.

In addition to the soaps of fatty acids, other water soluble salts of branch-chained or cyclic organic acids may be used to prepare oleophilic aluminum oxide gels.

The alumina hydrate gels and more particularly the oleophilic products of this invention are useful in preparing lubricating compositions. These products may be used, for example, as gelling agents for oleaginous liquids. In the preparation of waterproofed greases, 1 to 35 percent by weight of a waterproofed alumina hydrate containing about 1 to 20 percent by weight of a hydrophobic surface-active agent may be used to thicken a lubricating oil to a grease consistency. Any oleaginous liquid of lubricating viscosity may be used in the preparation of greases. These liquids may include, for example, mineral oils, preferably with a viscosity of 60 S.S.U. at 100° F. to 150 S.S.U. at 210° F. Polyoxyalkylene polymers, silicone fluids, organic phosphates, polymerized olefins, and esters of dicarboxylic acids, such as di(2-ethyl hexyl)sebacate.

Thus, a typical oleophilic product prepared according to this invention is that made in Example 5. After drying and grinding, it is a white powder which can be called a basic sodium aluminum stearate. Analysis of the product showed a composition which can be represented by the formula $NaAl(C_{19}H_{35}O_2)8Al_2O_3 \cdot xH_2O$, where $x$ varies with the conditions of drying from 1 to 12. This product, added to an oleaginous liquid, forms an excellent grease after the mixture has been heated to remove water and milled.

Other waterproofed alumina oxide hydrate gellants of this invention can be represented by the formula of $NaAl(R)_4 \cdot 8Al_2O_3 \cdot yH_2O$ where R is an organic radical having from 4 to 26 carbon atoms per molecule and $y$ is a value ranging from 0 to 12, depending on the drying conditions.

Example 9

A typical waterproofed grease was prepared by heating and milling a mixture of approximately 15 percent by weight of the oleophilic gel of Example 5 and a mineral lubricating oil. This grease had outstanding properties with respect to its penetration value, dropping point, water-insolubility, and compatibility with other greases.

Example 10

| | Parts by weight |
|---|---|
| Mineral lubricating oil | 75 |
| Gelling agent of Example 1 (based on the alumina hydrate content) | 15 |
| Stearic acid | 10 |

Example 11

| | |
|---|---|
| Di(2-ethyl hexyl)sebacate | 82 |
| Gelling agent of Example 1 (based on the alumina hydrate content) | 10 |
| Adipic acid | 8 |

Example 12

| | |
|---|---|
| Mineral lubricating oil | 90 |
| Finely-divided aluminum oxide of Example 2 | 10 |

Example 13

| | |
|---|---|
| Mineral lubricating oil | 75 |
| Gelling agent of Example 1 (based on the alumina hydrate content) | 15 |
| Oleic acid | 10 |

Example 14

| | |
|---|---|
| Mineral lubricating oil | 90 |
| Gelling agent of Example 7 | 10 |

Example 15

| | |
|---|---|
| Mineral lubricating oil (200 S.S.U. at 100° F.) | 80 |
| Hydrophobic gelling agent of Example 3 | 20 |

The above compositions are processed to a grease consistency by drying and milling an oil dispersion of the gelling agent until a grease structure is obtained.

The reason that the oleophilic hydrated aluminum oxide gels of this invention provide greases having improved lubricating characteristics, e.g. improved shear stability, is believed to be due to the nature of the gel per se. Here the inorganic portion of the oleophilic gel is in the shape of a rod and of sufficient size so that the attached olephilic radical, e.g., stearate or oleate, does not interfere by stearic hindrance with the bonding between the inorganic units.

The hydrated aluminum oxide hydrogel obtained by the process of Example 1 can also be converted to a hydrated aluminum oxide aerogel by washing it first with a lower alcohol, such as methyl alcohol, and then rewashing it with an aromatic solvent, such as toluene or xylene. This washing converts the hydrogel to an organogel which is then heated at atmospheric pressures to remove the organic liquid to obtain an aerogel of aluminum oxide. This aerogel is very light and has a low bulk density which makes it a desirable gelling agent, particularly for preparing greases.

The greases of this invention are particularly applicable in machinery operating at high temperatures and speeds. These include, for example, the lubrication of bearings, washing machines, motors, autos, aircraft, and the like.

In addition to the preparation of lubricating compositions, the aluminum oxide and hydrated aluminum oxide gels of this invention have other uses, such as, for example, in the food and pharmaceutical fields. Of particular utility is the hydrophobic aluminum oxide hydrate gel. These waterproofed gels are very efficient water-in-oil emusifying agents. For example, some of the most effective non-flammable hydraulic fluids are of the water-in-oil emulsion type. These fluids usually contain approximately 40 percent by weight of water and are stabilized with an emulsifying agent. It has been discovered that small amounts, e.g. 0.5 to 5 percent by weight, of these waterproofed aluminum hydrate gellants may be used effectively in stabilizing water-in-oil emulsions.

Although this invention has been described in connection with a few preferred embodiments, other variations and modifications may be resorted to by those skilled in the art, without departing from the principles of this invention. These variations and modifications are considered to be within the spirit and scope of the present invention as disclosed in the foregoing description and defined in the appended claims.

What is claimed is:

1. A waterproofed aluminum oxide hydrate gellant having a formula of $NaAl(R)_4 \cdot 8Al_2O_3 \cdot yH_2O$ where R is an organic radical having from 4 to 26 carbon atoms per molecule from the group of compounds consisting of higher aliphatic amines including at least 12 carbon atoms, polyamines, and their salts and amides, cyclic amines including the alkylated imidazolines, higher fatty acids, dicarboxylic acids, and water soluble soaps of saturated or unsaturated acids contining 4 to 26 carbon atoms pere molecule, and $y$ is a value ranging from 1 to 12.

2. The waterproofed aluminum oxide hydrate gellant of claim 1 further characterized in that R is a fatty acid radical.

3. A method of preparing a lubricating grease which comprises flushing a waterproofed aluminum oxide hydrate from an aqueous suspension with a major amount of lubricating oil to obtain a grease composition; said hydrate prepared by reacting aluminum sulfate with an alkali metal carbonate in an aqueous solution at a temperature below the boiling point of the solution to obtain a precipitate; boiling said precipitate for a period sufficient to obtain an aqueous suspension of aluminum oxide hydrate and reacting the hydrate with an anionic surface active agent to obtain a waterproofed gelling agent $$NaAl(R)_4 \cdot 8Al_2O_3 \cdot yH_2O$$

where R is an organic radical having from 4 to 26 carbon atoms per molecule selected from the group of compounds consisting of higher aliphatic amines including at least 12 carbon atoms, polyamines, and their salts and amides, cyclic amines including the alkylated imidazolines, higher fatty acids, dicarboxylic acids, and water soluble soaps of saturated and unsaturated acids containing 4 to 26 carbon atoms per molecule, and $y$ is a value ranging from 1 to 12.

4. The method of claim 3, further characterized in that the grease composition is dried and milled to a grease consistency.

5. The lubricating composition of claim 4, further characterized in that the hydrophobic surface active agent is a fatty acid compound.

References Cited by the Examiner
UNITED STATES PATENTS

| | | | |
|---|---|---|---|
| 2,554,222 | 5/51 | Stross | 252—28 |
| 2,599,683 | 6/52 | Abrams et al. | 252—25 |
| 2,623,852 | 12/52 | Peterson | 252—28 |
| 2,739,121 | 3/56 | Weihe et al. | 252—25 |
| 2,905,534 | 9/59 | Braithwaite | 252—317 X |
| 2,915,475 | 12/59 | Bugosh | 252—25 |
| 3,028,334 | 4/62 | Wilson | 252—42.1 X |
| 3,031,417 | 4/62 | Bruce | 252—317 X |

DANIEL E. WYMAN, *Primary Examiner.*

JOSEPH R. LIBERMAN, JULIUS GREENWALD,
*Examiners.*

UNITED STATES PATENT OFFICE
CERTIFICATE OF CORRECTION

Patent No. 3,174,930            March 23, 1965

Vivian R. Damerell

It is hereby certified that error appears in the above numbered patent requiring correction and that the said Letters Patent should read as corrected below.

Column 7, line 22, for "0 to 12" read -- 1 to 12 --; column 8, line 47, for "pere" read -- per --.

Signed and sealed this 3rd day of August 1965.

(SEAL)
Attest:

ERNEST W. SWIDER
Attesting Officer

EDWARD J. BRENNER
                                                   Commissioner of Patents